United States Patent
Ji et al.

(10) Patent No.: US 11,202,259 B2
(45) Date of Patent: Dec. 14, 2021

(54) APPARATUS, SYSTEM, AND METHOD FOR MOBILE STATION POWER SAVING

(71) Applicant: Apple Inc., Cupertino, CA (US)

(72) Inventors: Zhu Ji, San Jose, CA (US); Jia Tang, San Jose, CA (US); Dawei Zhang, Saratoga, CA (US); Wei Zeng, San Diego, CA (US); Yuchul Kim, Santa Clara, CA (US); Pengkai Zhao, San Jose, CA (US); Beibei Wang, Cupertino, CA (US); Haitong Sun, Irvine, CA (US); Wei Zhang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 189 days.

(21) Appl. No.: 16/590,656

(22) Filed: Oct. 2, 2019

(65) Prior Publication Data

US 2020/0145918 A1 May 7, 2020

Related U.S. Application Data

(60) Provisional application No. 62/755,218, filed on Nov. 2, 2018.

(51) Int. Cl.
*H04W 52/02* (2009.01)
*H04W 68/00* (2009.01)
*H04W 72/04* (2009.01)

(52) U.S. Cl.
CPC ... *H04W 52/0216* (2013.01); *H04W 52/0229* (2013.01); *H04W 68/005* (2013.01); *H04W 72/0446* (2013.01)

(58) Field of Classification Search
CPC ......... H04W 52/0216; H04W 52/0229; H04W 68/005; H04W 72/0446
USPC ....................................................... 370/311
See application file for complete search history.

(56) References Cited

U.S. PATENT DOCUMENTS

| | | | |
|---|---|---|---|
| 9,363,775 B2 | 6/2016 | Ahn | |
| 9,693,383 B2 | 6/2017 | Lee | |
| 9,872,252 B1 | 1/2018 | Ang | |
| 10,412,704 B2 | 9/2019 | Sun | |
| 10,432,378 B2 | 10/2019 | Ang | |

(Continued)

OTHER PUBLICATIONS

Mediatek, Inc: "On TRS Design," 3GPP Draft; R1-1713713 On TRS Design Final, 3rd Generation Partnership Project, France, vol. RAN WG1, No. Prague, Czech Replublic; 201708-21-20170825, Aug. 20, 2017, XP051316512, Retrieved from http://www.3gpp.org/ftp/Mettings_3GPP_SYNC/RAN1/Docs, 14 pages.

(Continued)

*Primary Examiner* — Christopher R Crompton
(74) *Attorney, Agent, or Firm* — Kowert, Hood, Munyon, Rankin & Goetzel, P.C.

(57) ABSTRACT

Apparatuses, systems, and methods for performing power saving for a wireless device. The wireless device may connect to a base station (BS). The wireless device may establish discontinuous reception (DRX) with the BS, where the DRX comprises a DRX cycle having a cycle length. The wireless device may receive reference signal information from the base station in association with the DRX cycle length, where the reference signal information is transmitted according to the cycle length. The wireless device may perform tracking using the reference signal information.

20 Claims, 7 Drawing Sheets

(56) References Cited

U.S. PATENT DOCUMENTS

| | | | |
|---|---|---|---|
| 2012/0257522 A1 | 10/2012 | Hiroyuki et al. | |
| 2015/0029920 A1* | 1/2015 | Hoehne | H04W 76/28 |
| | | | 370/311 |
| 2015/0030037 A1 | 1/2015 | Joonkui et al. | |
| 2016/0219475 A1* | 7/2016 | Kim | H04W 36/04 |
| 2018/0063883 A1* | 3/2018 | Nagaraja | H04W 72/046 |
| 2018/0098287 A1 | 4/2018 | Ang | |
| 2019/0059054 A1 | 2/2019 | Lee | |
| 2019/0215117 A1* | 7/2019 | Lee | H04L 5/0051 |
| 2020/0168747 A1* | 5/2020 | Summerfelt | H01L 21/76886 |
| 2020/0287678 A1* | 9/2020 | Li | H04L 5/0048 |

OTHER PUBLICATIONS

Extended European Search Report from U.S. Appl. No. 19/206,204.0-1205, Apple Inc., dated Mar. 20, 2019, nine pages.

* cited by examiner

APPARATUS, SYSTEM, AND METHOD FOR MOBILE STATION POWER SAVING

PRIORITY

This application claims benefit of priority of U.S. provisional application Ser. No. 62/755,218 titled "Apparatus, System, and Method for Mobile Station Power Saving" filed Nov. 2, 2018, which is hereby incorporated by reference in its entirety as though fully and completely set forth herein.

FIELD

The present application relates to wireless devices, and more particularly to apparatus, systems, and methods for a wireless device to establish and maintain concurrent connections with current radio access technologies and next generation radio access technologies.

DESCRIPTION OF THE RELATED ART

Wireless communication systems are rapidly growing in usage. Further, wireless communication technology has evolved from voice-only communications to also include the transmission of data, such as Internet and multimedia content. Additionally, security has become increasingly important in wireless communication, particularly where communication flows are can be hijacked. Thus, improvements in the field are desired.

SUMMARY

Embodiments relate to apparatuses, systems, and methods to perform power saving for a wireless device.

The wireless device may connect to a base station (BS). The wireless device may establish discontinuous reception (DRX) with the BS, where the DRX comprises a DRX cycle having a cycle length. The wireless device may receive reference signal information from the base station in association with the DRX cycle length, where the reference signal information is transmitted according to the cycle length. The wireless device may perform tracking using the reference signal information.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
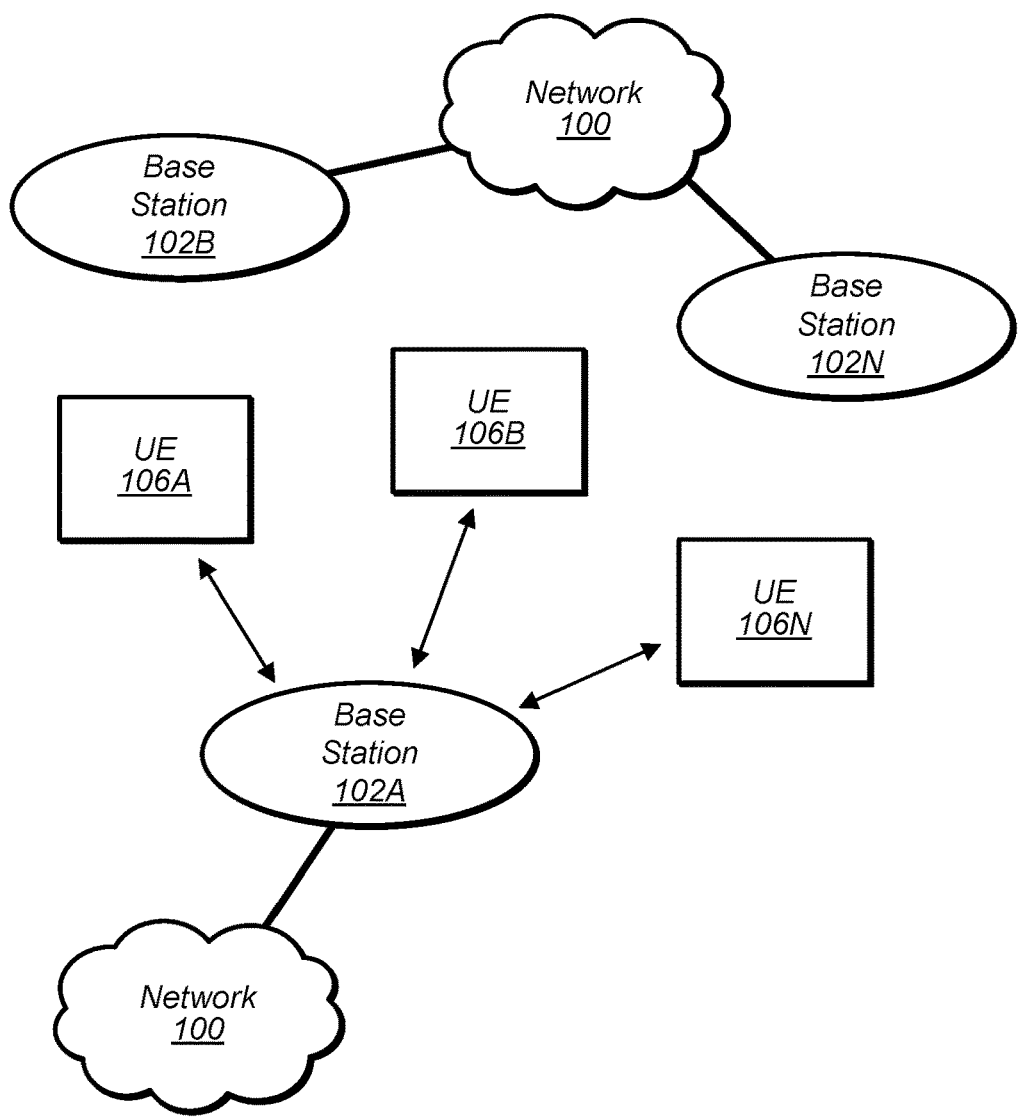
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
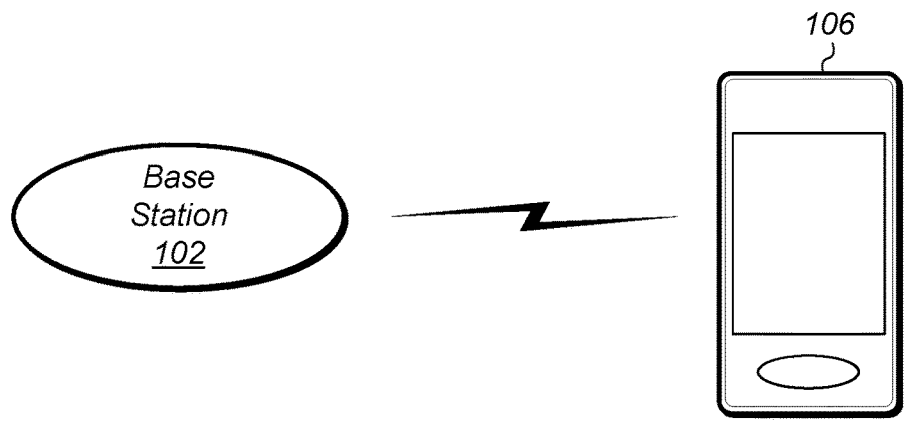
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1xRTT or LTE or GSM), and separate radios for communicating using each of Wi-Fi and Bluetooth. Other configurations are also possible.

Figure 3:
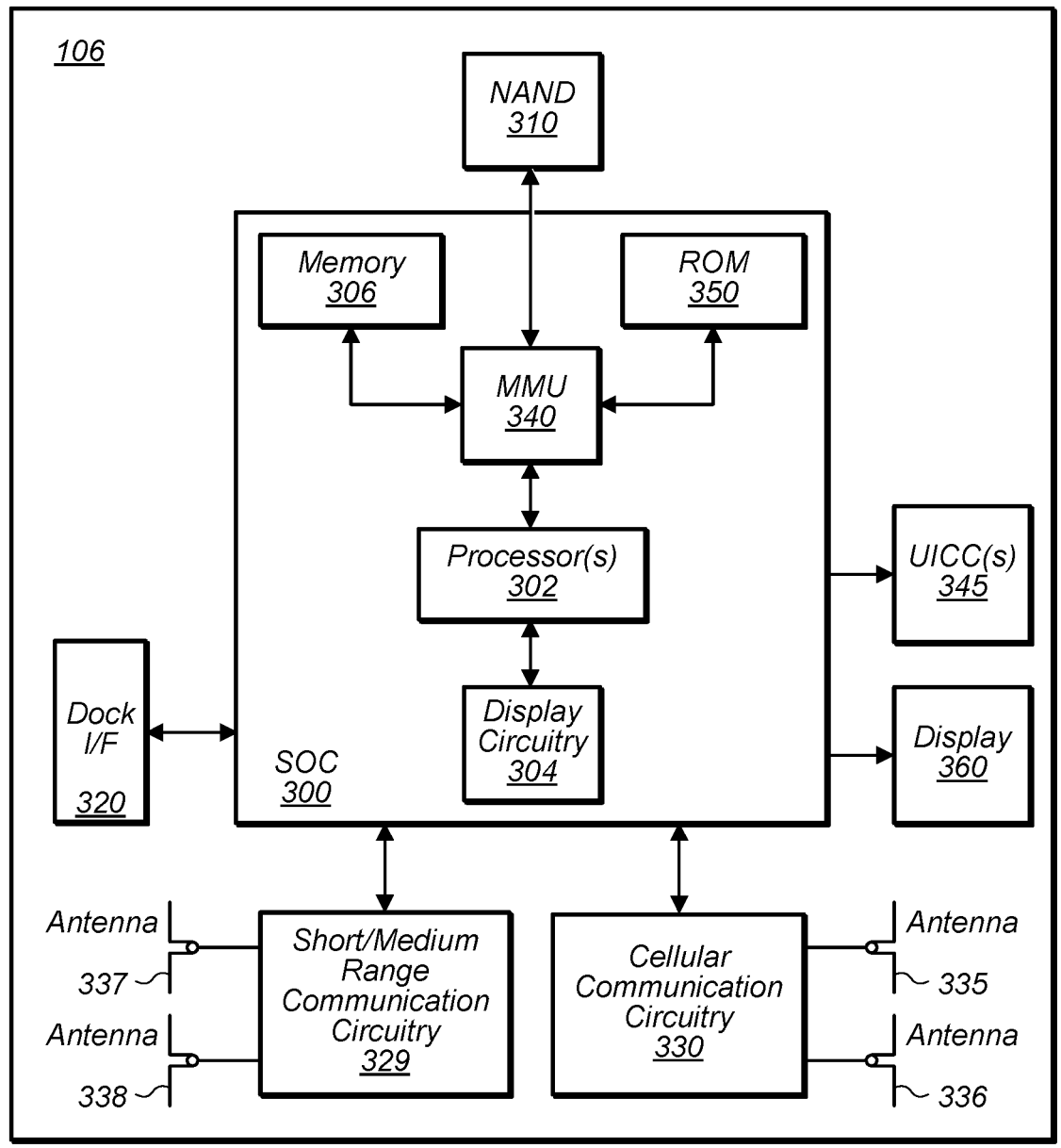
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing the above features for time division multiplexing UL data for NSA NR operations. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition)

the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
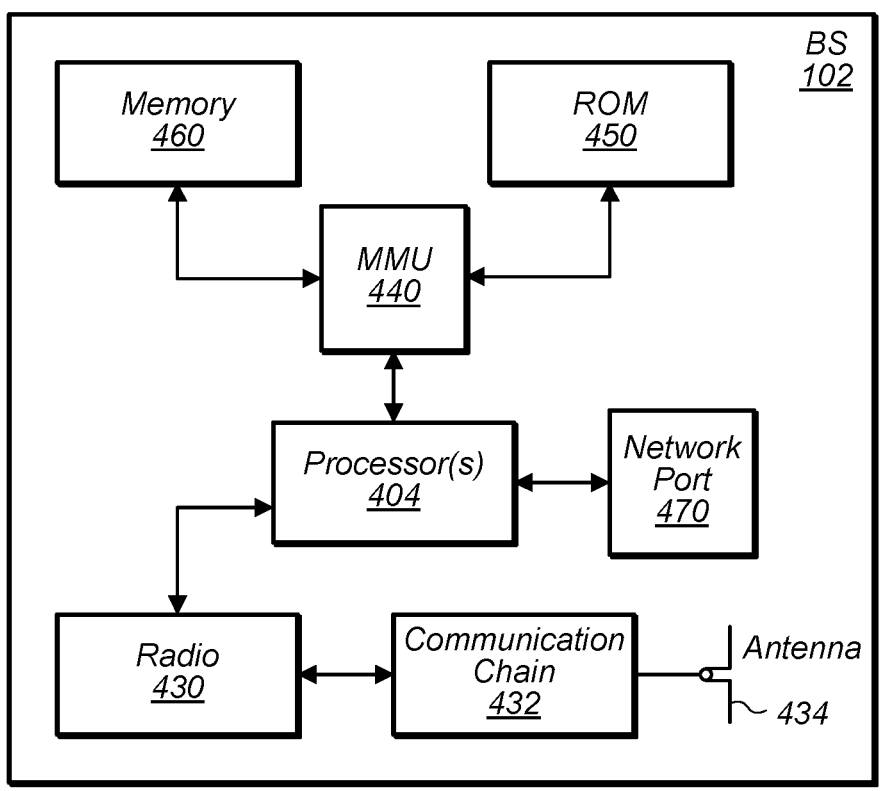
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
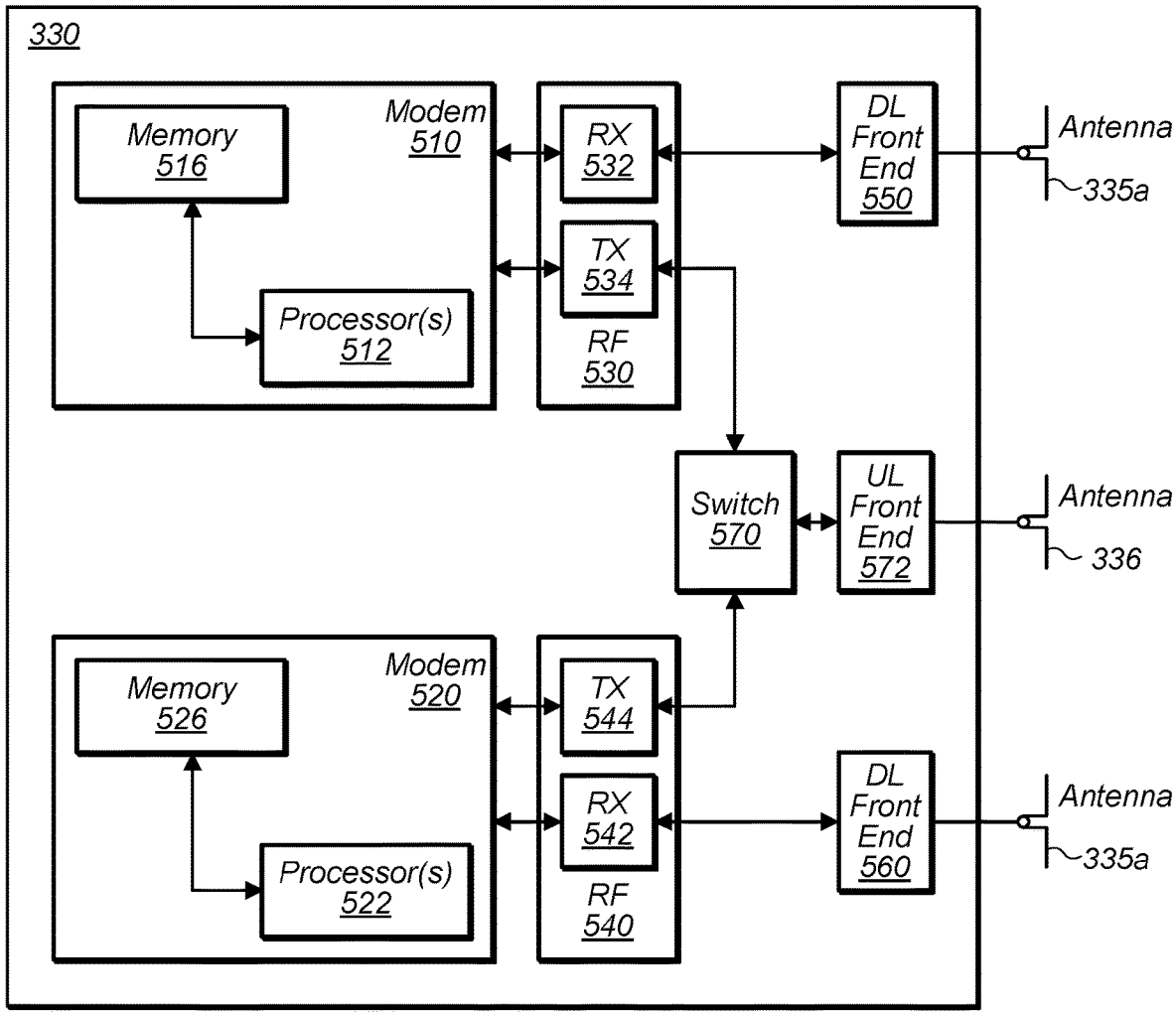
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to establish a first wireless link with a first cell according to a first radio access technology (RAT), wherein the first cell operates in a first system bandwidth and establish a second wireless link with a second cell according to a second radio access technology (RAT), wherein the second cell operates in a second system bandwidth. Further, the cellular communication circuitry 330 may be configured to determine whether the cellular communication circuitry 330 has uplink activity scheduled according to both the first RAT and the second RAT and perform uplink activity for both the first RAT and the second RAT by time division multiplexing (TDM) uplink data for the first RAT and uplink data for the second RAT if uplink activity is scheduled according to both the first RAT and the second RAT. In some embodiments, to perform uplink activity for both the first RAT and the second RAT by time division multiplexing (TDM) uplink data for the first RAT and uplink data for the second RAT if uplink activity is scheduled according to both the first RAT and the second RAT, the cellular communication circuitry 330 may be configured to receive an allocation of a first UL subframe for transmissions according to the first RAT and an allocation of a second UL subframe for transmissions according to the second RAT. In some embodiments, the TDM of the uplink data may be performed at a physical layer of the cellular communication circuitry 330. In some embodiments, the cellular communication circuitry 330 may be further configured to receive an allocation of a portion of each UL subframe for control signaling according to one of the first or second RATs.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for time division multiplexing UL data for NSA NR operations, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Non-Standalone (NSA) Operation with LTE

Figure 6A:
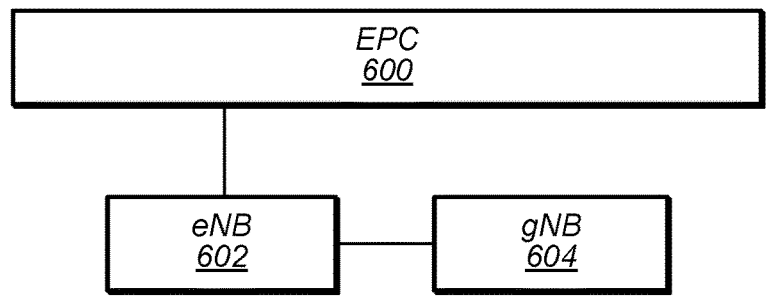
FIG. 6A illustrates an example of connections between an EPC network, an LTE base station (eNB), and a 5G NR base station (gNB).
Figure 6B:
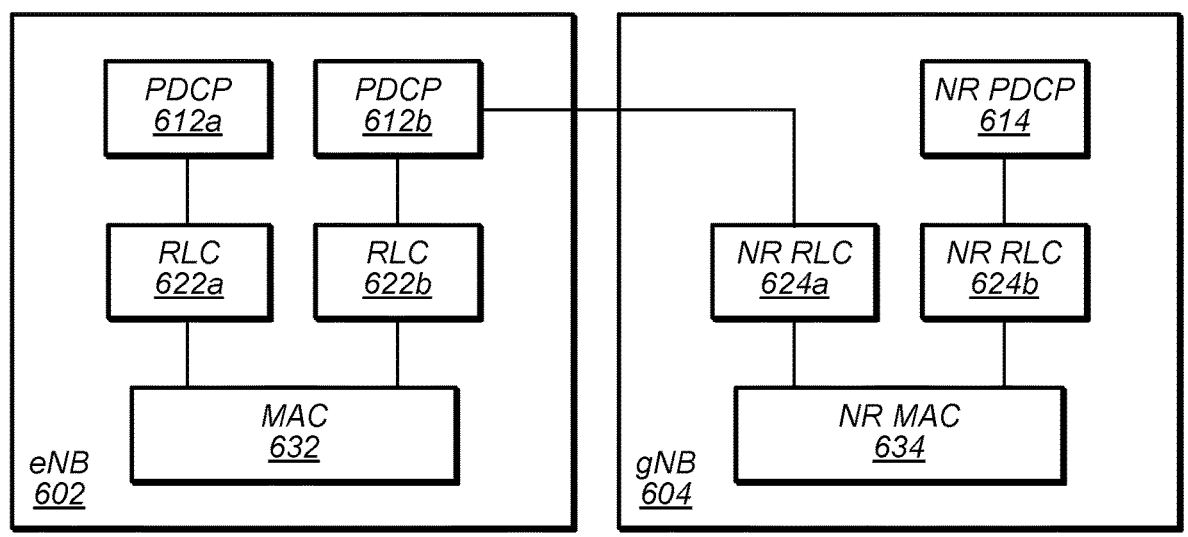
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 622b of eNB 602 via an $X_2$ interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

In general, a non-stand alone (NSA) implementation employs dual connectivity in both uplink (UL) and downlink (DL). In other words, dual connectivity requires two active radio links in both UL and DL. In some implementations, depending on frequency band combinations, two (substantially) concurrent UL connections may cause receiver sensitivity degradation at the UE. For example, in some proposed implementations, a UE may be required to support 4 DL and 1 UL connection in LTE on bands 1 (UL: 1920-1980 MHz, DL: 2110-2170 MHz), 3 (UL: 1710-1785 MHz, DL: 1805-1880 MHz), 7 (UL: 2500-2570 MHz, DL: 2620-2690 MHz), and 20 (UL: 832-862 MHz, DL: 791-821 MHz) while (substantially) concurrently supporting 1 DL and 1 UL connection in NR at 3400-3800 MHz. In such implementations, a $5^{th}$ order intermodulation product (IM5) produced at a 5G NR transmitter of the UE from a $2^{nd}$ harmonic of LTE UL band 3 and NR UL may fall into LTE DL band 7 frequencies during (substantially) simultaneous UL operation. Similarly, a $4^{th}$ order harmonic of LTE UL band 20 and NR UL transmission may create a $5^{th}$ order intermodulation product that may interfere with LTE DL band 7 reception and thus desensitize a receiving for LTE DL band 7.

In addition, future specifications NR NSA may require a UE to support co-existence of LTE UL and NR UL within the bandwidth of an LTE component carrier and co-existence of LTE DL and NR DL within the bandwidth of an LTE component carrier. Further, such an implementation may be further required to minimize impact to NR physical layer design to enable such co-existence and to not impact LTE legacy devices (e.g., devices that do not support NR) operating on an LTE carrier co-existing with NR.

Thus, in some implementations of NR NSA, a UE may be configured with multiple UL carriers on different frequencies (e.g., where there is at least one LTE carrier and at least one NR carrier of a different carrier frequency) but operate on either the LTE carrier or the NR carrier at a given time. In other words, the UE may be configured to operate on only one of the carriers at a given time among a pair of LTE and NR carriers. Note that such an implementation may also allow for (substantially) simultaneous operation on two or more UL carriers at a given time.

Embodiments described herein define systems, methods, and mechanisms for a UE to support 5G NSA.

Wireless Device Power Saving and Reference Signals

Due to lack of "always ON" signal (e.g., CRS for LTE), the NR standard imposes new challenges to the UE design on its "tracking" capability. For example, it may be difficult for a UE to efficiently perform automatic gain control (AGC), e.g., to track the signal strength, time tracking, frequency tracking, SNR and channel estimation, and/or beam tracking, among other aspects.

The issue may become more pronounced under dynamic traffic scenarios (e.g., CDRX and idle-DRX), where the transmitted or received data pattern may be bursty in nature. For example, an NR UE may need to wake up more frequently and/or longer to reliably track the NR signal. As one possibility, the UE may need to wake up during synchronization signal block (SSB) burst (typically transmitted once every 20 ms) to run AGC or timing/frequency tracking, which would result in an undesirable amount of UE power consumption.

For example, with a 160 ms CDRX cycle, the UE may typically go into a "deep" sleep state. However, if the UE has to wake up in the middle of the CDRX cycle to monitor SSB, it may not get a chance to go into deep sleep state, which may have a significant impact on UE power consumption.

In one embodiment, the UE may alternatively perform various tasks using reference signals transmitted with (e.g., before or during) an associated CDRX cycle. For example, the reference signals may be tracking reference signals (TRS) or channel state information reference signals (CSI-RS), among other types of reference signals. By receiving the reference signals in association with CDRX cycles, the UE may be able to avoid performing tracking at other times, and thus be able to remain in sleep during DRX off durations where it otherwise would not have been able to.

For example, the base station (e.g., gNB) may transmit reference signals some number of slots before (or potentially at the beginning of) a CDRX on duration associated with the UE. In some embodiments, whether or not the base station transmits this information may be based on the CDRX cycle length. For example, if the CDRX cycle length is longer than a threshold (e.g., 80 ms), the base station may automatically transmit the reference signals with or in association with the CDRX on duration. In some embodiments, this reference signal transmission behavior may be specified by the NR standard, and thus it may be assumed and performed automatically by the base station and the UE. In one embodiment, the detailed implementation may be determined by the base station or network, but the UE may be able to safely assume reference signal information will be transmitted, e.g., before the CDRX on duration. In one embodiment, the number of symbols before the CDRX on duration may be predetermined (e.g., 1, 2, 3, 4, 5, slots before), e.g., as specified by the standard.

As another possibility, rather than the reference signal information being assumed to be transmitted in association with the CDRX on duration, the base station may explicitly indicate the reference signal information in a CDRX configuration. Thus, in one embodiment, when the base station configures CDRX, it may indicate reference signal transmission at the beginning of each cycle as part of the CDRX configuration, e.g., if the CDRX cycle is longer than a threshold (e.g., 80 ms).

In one embodiment, this indication may be an index pointing to a reference signal (e.g., CSI-RS) configuration, e.g., which automatically makes reference signal configuration dependent on different CDRX configurations. Alternatively, other indications are envisioned, e.g., with a simple indication of whether or not reference signal information will be transmitted with CDRX cycles, an indication of the number of slots this information will be transmitted before or after the CDRX on duration, etc.

For FR2 with beam management, the base station may configure a set of beams (e.g., P2 procedure) in front of CDRX as part of CDRX configuration. A beam report from UE may also be used by the base station to use the correct beam for CDRX on-duration.

Note that in NR, TRS/CSI-RS may currently only be defined in connected mode, but not idle mode. However, the issues of AGC/TTL/FTL described above also applies to idle mode. In addition, UE idle power is also important. Therefore, various embodiments described herein related to CDRX may also apply to idle DRX.

For example, in one embodiment, the base station may transmit reference signal information (e.g., TRS and/or CSI-RS) before (e.g., 1, 2, 3, 4, 5 slots) or during a DRX paging occasion. Similar to above descriptions regarding CDRX, this behavior may be implicit or predefined by the standard or may be explicitly specified during DRX configuration, e.g., as an index pointing to a quasi co-located (QCL) SSB, as a generic indication that reference signal information will be transmitted, specifying a number of slots before or after the beginning of the paging occasion, etc. For FR2 with beam management, gNB may configure a set of beams (e.g., P2 procedure) to transmit reference information before or during the paging occasion as part of DRX configuration.

In some embodiments, the UE may be involved in the configuration of the reference signal transmission for CDRX and/or DRX. For example, the UE may be configured to provide information or feedback to the base station of a set of UE preferred parameters which, from UE perspective, are helpful for power saving. For example, the UE may provide its preferred CDRX parameters to the base station, such as requesting the base station to send the reference signal information for each CDRX on duration or DRX paging occasion.

In some embodiments, the UE may request a specific time for the base station to send the reference signal information, such as m slots (or symbols) before (or potentially after) the on duration or paging occasion lasting n slots (e.g., n consecutive slots). Thus, in one embodiment, the UE may request the values of m and/or n when requesting the reference signal information be transmitted in association with the CDRX or DRX cycles. It may not be necessary to have m be the same as n, to provide more flexibility. For example, n can be larger than m to have reference signal information extend into CDRX on duration or the paging occasion as well. In good radio frequency (RF) conditions, m and n can be smaller (e.g., 1~2 slots). In bad RF conditions, m and n can be larger (e.g., 4~8 slots) to give UE tracking loop more time to converge. Thus, the values of m and/or n could vary dynamically, e.g., depending on the channel conditions. These values could change in response to feedback or requests from the UE and/or automatically by the base station (e.g., which may indicate the changes to the UE), as desired.

Accordingly, the UE may not have to schedule extra wake up just for tracking. Instead, the tracking algorithm may run, e.g., right before, the CDRX on duration or DRX paging occasion to provide both power and performance gain.

Note that it may be up to the base station to follow the UE recommendation or not.

Figure 7:
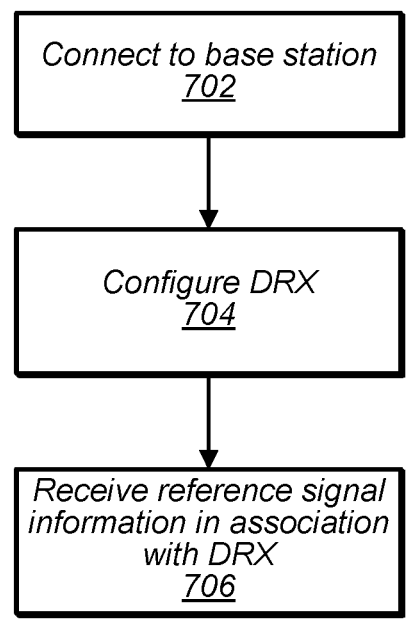
FIGS. 7 and 8 are flowchart diagrams illustrating exemplary methods for power saving for a wireless device.

FIG. 7—Reference Signal Transmission

FIG. 7 is a flowchart diagram illustrating a method for reference signal transmission as part of a CDRX or idle DRX cycle. Aspects of the method of FIG. 7 may be implemented by a wireless device, a base station, and/or a network, such as a UE 106, the BS 102, and/or the network 100 (e.g., a 5G AMF) illustrated in and described with respect to various of the Figures herein, or more generally in conjunction with any of the computer systems or devices shown in the above Figures, among other devices, as desired. Additionally, various steps may be performed by one or more processors, e.g., such as UE processor 302, processors found in cellular communication circuitry 330 or communication circuitry 329, BS processor 404, or other processors of the BS communication circuitry, processors 512 or 522, etc. In various embodiments, some of the elements of the methods shown may be performed concurrently, in a different order than shown, may be substituted for by other method elements, or may be omitted. Additional method elements may also be performed as desired. As shown, the method of FIG. 7 may operate as follows.

In 702, the UE (e.g., UE 106) may connect to the BS (e.g., BS 102). The UE and BS may perform various attachment procedures, authentication procedures, etc.

In 704, the UE and the BS may configure DRX. According to various embodiments, the DRX may be a connected mode DRX (CDRX) or an idle mode DRX. As noted above, whether reference signal information is transmitted in association with the DRX (e.g., before CDRX on duration or idle mode DRX paging occasion) may be implicit or explicit. In some embodiments, the reference signal information may be predetermined to be sent (e.g., specified by NR standards) without requiring additional signaling, or the reference signal information may be explicitly indicated in signaling. For example, the BS may indicate that the reference signals may be transmitted in association with the DRX cycle during DRX configuration. In some embodiments, the BS may specify the location of the reference signals. The location may be a certain number of symbols or slots before CDRX on duration, a specific location within the CDRX on duration, a certain number of symbols or slots before DRX on duration, a specific location within DRX on duration, a certain number of symbols or slots before a DRX paging occasion, during a DRX paging occasion, etc. Note that the number of symbols or slots may be consistent across idle DRX or CDRX or may be independently specified, as desired. Additionally, the UE may be configured to request this configuration (e.g., the number of symbols or slots before or after the on duration or paging occasion) during DRX configuration, e.g., in a negotiated fashion.

As noted above, in some embodiments, whether the reference signal information is transmitted may be based on the CDRX or idle DRX cycle length. For example, the reference signal information may be transmitted automatically when the cycle length is above a threshold length. The thresholds may be different for CDRX or idle mode DRX, as desired. In some embodiments, this threshold may be known to both the UE and BS and thus the BS may transmit (and correspondingly, the UE may assume the transmission of) the reference signals automatically when the threshold length has been reached. In some embodiments, the threshold may be indicated by the base station and/or requested by the UE (e.g., during DRX configuration) or may be known by both parties without negotiation (e.g., it may be specified by 3GPP standards, or may be carrier negotiated, as desired).

In 706, based on the configuration of 704, the UE may receive the reference signal information in association with the DRX cycle. For example, the UE may receive the reference signal information a few symbols (e.g., two symbols) before the CDRX on duration or the paging occasion in DRX idle mode.

The UE may use the reference signal information for various purposes, such as AGC, timing tracking, frequency tracking, etc. By performing tracking using the reference signal information transmitted in association with the DRX cycle, the UE may avoid performing tracking at other times, e.g., when it would otherwise sleep, such as during DRX off duration.

PDCCH Detection

In some cases, NR PDCCH uses polar codes instead tail-biting convolutional codes (TBCC) in LTE. As a result, the power consumption of NR PDCCH decode may be higher compared to that of LTE. Similar to LTE PDCCH, NR PDCCH is also based on blind decodes; however, the number of decode candidates is higher than that of LTE.

Accordingly, if the number of PDCCH candidates can be reduced for polar decodes, non-trivial UE power saving may be achieved. Thus, the more PDCCH candidates that are pruned, the more power saving can be achieved.

As noted above, unlike in LTE, there is no "always ON" reference signal (e.g., CRS) for NR. However, when PDCCH is present, there may also be an associated demodulation reference signal (DMRS) present. DMRS may be transmitted in a narrow-band or wide-band fashion, e.g., indicated by the base station upon establishing a connection.

For narrow-band DMRS, if the higher-layer parameter precoderGranularity is the same as the REG bundle size, DMRS may be present within the REGs constituting the PDCCH. For wide-band DMRS, if the higher-layer parameter precoderGranularity is the same as the size of the CORESET in the frequency domain, PDCCH DMRS may be present within all REGs of the CORESET (similar to CRS). Accordingly, the detection of the presence of DMRS may be used to infer the presence of PDDCH.

DMRS presence may be determined in a variety of ways. For example, if the DMRS SNR is high, then DMRS is likely present. However, if the DMRS SNR is relatively low, it may not be clear if this is due to DMRS non-presence or due to actual low SNR.

This DMRS SNR metric (which may be determined at CCE, REG, or CORESET granularity) can be obtained by coherent or non-coherent correlation combining approaches. The SNR metric (which again may be determined at CCE, REG, or CORESET granularity) can also be obtained from PDCCH DMRS-based channel estimation.

In this case, it may be useful to track a reference metric to indicate the current channel condition. If the reference metric (e.g., a reference SNR) indicates a good channel condition whereas DMRS SNR is low, then DMRS is not present and thus the corresponding PDCCH candidate is not present. Therefore, that candidate can be safely pruned and saving can be achieved under good channel condition. However, if the reference information indicates a bad channel whereas DMRS SNR is low, then a conclusion may not be possible. In this case, it may be best to still try decoding the PDCCH candidate to achieve higher PDCCH reliability.

Unfortunately such a reference may not always be available in NR. In some embodiments, the reference metric could be obtained from reference signals, e.g., which could be provided as part of DRX or CDRX, following any of the embodiments described above. Thus, the UE may use the reference signals to create a reference metric to compare the DMRS SNR metric against. Thus, through the transmitted reference signal information, the UE may obtain a "reference metric" for the present channel condition when a desired signal is present. This reference metric may be used by the following slots for PDCCH detection. If multiple PDCCH CORESETs correspond to different QCL, UE can request multiple reference signals accordingly.

Thus, in one embodiment, one or more slots or symbols before (or potentially one or more slots after) CDRX on duration or DRX idle mode paging occasion, reference information may be received by the UE from the BS. In the following slots, as long as a new grant from a certain slot is detected, reference information may be updated based on the new channel condition from that slot (e.g., through genuine DMRS of the PDCCH). The UE may keep updating the reference based on the "last known good sample" (e.g., DMRS, PDCCH, or other signals, as desired). Thus, according to various embodiments, the "reference metric" may be generated from reference signals (e.g., transmitted in association with DRX), NW-assisted information, and/or actual decoded information.

If the gap from last known good sample is too long, the reference metric may become less reliable and may have to be dropped or weighted with a forgetting factor. If multiple CORESETs are QCL, information across CORESETs can be exchangeable for the reference metric. Otherwise, UE should maintain last known good sample information independently for each CORESET.

For wide-band DMRS, UE can accumulate the DMRS energy/SNR metric across the entire CORESET bandwidth. In one embodiment, if the DMRS SNR is below the reference SNR by a threshold (e.g., DMRS SNR is 20 dB lower than reference SNR), all the PDCCH candidates associated with the CORESET may be pruned. However, if the DMRS SNR is above the threshold, UE may have to decode each PDCCH candidate for blind decode. As another possibility, the UE may determine the presence of PDCCH based on data tone energy detection.

In some embodiments, if multiple CORESETs are QCL and have overlapping region, and if the DMRS SNR of the overlapped portion is below a threshold compared to reference, then multiple CORESETs can be pruned. Otherwise, each CORESET may be pruned independently.

For narrow-band DMRS, UE can accumulate the DMRS SNR metric within each PDCCH candidate, e.g., starting from candidates with minimal CCE (e.g., aggregation level AL1). If the DMRS SNR metric is below a threshold compared to the reference SNR (although any metric comparison is envisioned), then that particular candidate can be pruned.

Furthermore, in some embodiments, for each CORESET, once a candidate with smaller CCEs (e.g., AL1) are pruned, all candidates with larger CCEs (e.g., AL2/4/8) that are overlapped with this candidate may be pruned as well. Again, across CORESET pruning can be possible if they are QCL. Otherwise, each CORESET pruning may be performed independently.

Thus, according to various embodiments: the UE may request gNB send NW-assisted information (e.g., CSI-RS/TRS) to help PDCCH detection/pruning and achieve power saving; the UE may alternatively (or additionally) use NW-assisted information and actual decoded information as reference for PDCCH detection/pruning; and the UE may effectively prune PDCCH candidates for both wide-band DMRS and narrowband DMRS.

Figure 8:
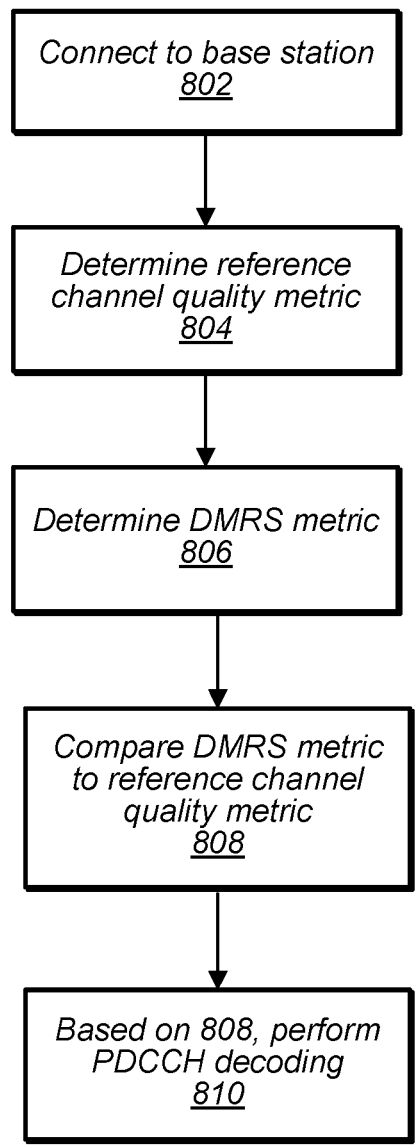

FIG. 8—PDCCH Decoding

FIG. 8 is a flowchart diagram illustrating a method for performing PDCCH decoding. Aspects of the method of FIG. 8 may be implemented by a wireless device, a base station, and/or a network, such as a UE 106, the BS 102, and/or the network 100 (e.g., a 5G AMF) illustrated in and described with respect to various of the Figures herein, or more generally in conjunction with any of the computer systems or devices shown in the above Figures, among other devices, as desired. In various embodiments, some of the elements of the methods shown may be performed concurrently, in a different order than shown, may be substituted for by other method elements, or may be omitted. Additional method elements may also be performed as desired. As shown, the method of FIG. 8 may operate as follows.

In 802, the UE (e.g., UE 106) may connect to a base station (BS).

In 804, the UE may determine a reference channel quality metric. Determining the reference channel quality metric may include determining a signal to noise ratio (SNR) (or any other desired metric) of a reference signal. The reference signal may be a reference signal (e.g., TRS or CSI-RS), which may be transmitted in association with a DRX cycle. Alternatively, or additionally, the reference channel quality metric may be based on a metric previously obtained, e.g., such as a previous PDCCH decoding, NW assist information, or any other signal previously obtained from the BS.

In 806, the UE may determine a demodulation reference signal (DMRS) metric. The DMRS metric may be a DMRS SNR.

In 808, the UE may compare the DMRS metric to the reference channel quality metric. In some embodiments, the comparison may involve finding a difference between the DMRS metric and the reference channel quality metric. This difference may be compared to a threshold. For example, 808 may involve comparing the difference of the DMRS SNR to a reference SNR to a threshold value (e.g., 20 dB).

In 810, based on comparing the DMRS metric to the reference channel quality metric in 808, the UE may perform PDCCH decoding one or more times. For example, if the DMRS metric is below the reference metric by a threshold amount, a current PDCCH candidate may be pruned or removed from the PDCCH space. Alternatively, if the DMRS metric is not below the reference metric by a threshold amount, the PDCCH candidate may be decoded to determine if PDCCH is present.

Note that 806-810 may be performed a plurality of times, each for one or more PDCCH candidates. In some embodiments, a plurality of PDCCH candidates may be removed based on the comparison of an individual candidate in 810. For example, where DMRS is wideband, when one candidate from a CORESET is eliminated, the remaining members of the CORESET may also be eliminated. Alternatively, for wideband DMRS, if the PDCCH candidate is viable and is decoded, the remainder of the candidates may also be decoded until the PDCCH is found.

Furthermore, for narrowband DMRS, once a candidate with smaller CCEs (e.g., AL1) are pruned, all candidates with larger CCEs (e.g., AL2/4/8) that are overlapped with this candidate may be pruned as well. Otherwise, each candidate pruning may be performed independently.

When the PDCCH is found, the remaining candidates may not be decoded or searched.

Exemplary Embodiments

In some embodiments, a method, may include, by a UE: connecting to a base station (BS); establishing discontinuous reception (DRX) with the BS, wherein the DRX comprises a DRX cycle having a cycle length; receiving reference signal information from the base station in association with the DRX cycle length, wherein the reference signal information is transmitted according to the cycle length; and performing tracking using the reference signal information.

In some embodiments, the DRX comprises connected mode DRX (CDRX).

In some embodiments, the reference signal information is received one or more symbols before the CDRX on duration of each cycle.

In some embodiments, the DRX comprises idle mode DRX.

In some embodiments, the reference signal information is received one or more symbols before the paging occasion of each cycle.

In some embodiments, the UE and BS communicate according to new radio (NR).

In some embodiments, establishing DRX with the BS comprises receiving DRX configuration information from the BS, wherein the location of the reference signal information is specified in the DRX configuration information.

In some embodiments, the location of the reference signal information is not indicated by the BS.

In some embodiments, establishing DRX with the BS comprises transmitting preferred DRX parameters to the BS.

In some embodiments, the preferred DRX parameters include a preferred number of symbols for transmitting the reference signal information prior to a beginning of a DRX cycle.

In some embodiments, a method may include, by a UE: connecting to a base station (BS); determining a reference channel quality metric; determining a demodulation reference signal (DMRS) metric; comparing the DMRS metric to the reference channel quality metric; based on comparing the DMRS metric to the reference channel quality metric, performing PDCCH decoding one or more times; and decoding the PDCCH.

In some embodiments, determining the reference channel quality metric comprises determining a signal to noise ratio (SNR) of a reference signal.

In some embodiments, the reference signal is provided in conjunction with a discontinuous reception (DRX) cycle.

In some embodiments, the DMRS metric comprises a DMRS SNR.

In some embodiments, comparing the DMRS metric to the reference channel quality metric comprises comparing the difference between the DMRS metric and the reference channel quality metric to a threshold.

In some embodiments, performing PDCCH decoding comprises pruning one or more PDCCH candidates based on the comparison of the DMRS metric to the channel quality metric.

In some embodiments, the BS transmits DMRS in a narrow-band.

In some embodiments, the BS transmits the DMRS in a wide-band.

In some embodiments, a device may include: an antenna; a radio coupled to the antenna; and a processing element coupled to the radio; and may be configured to implement any embodiments described herein.

In some embodiments, a memory medium comprising program instructions that, when executed, cause a device to implement any embodiments described herein.

In some embodiments, an apparatus, comprising: a memory; and at least one processor in communication with the memory may be configured to implement any embodiments described herein In some embodiments, a method may include any action or combination of actions as substantially described herein in the Detailed Description and claims.

In some embodiments, a method may include any embodiments as substantially described herein with reference to each or any combination of the Figures contained herein, with reference to each or any combination of paragraphs in the Detailed Description, with reference to each or any combination of Figures and/or Detailed Description, or with reference to each or any combination of the claims.

In some embodiments, a wireless device may be configured to perform any action or combination of actions as substantially described herein in the Detailed Description, Figures, and/or claims.

In some embodiments, a wireless device may include any component or combination of components as described herein in the Detailed Description and/or Figures as included in a wireless device.

In some embodiments, a non-volatile computer-readable medium may store instructions that, when executed, cause the performance of any action or combination of actions as substantially described herein in the Detailed Description and/or Figures.

In some embodiments, an integrated circuit may be configured to perform any action or combination of actions as substantially described herein in the Detailed Description and/or Figures.

In some embodiments, a mobile station may be configured to perform any action or combination of actions as substantially described herein in the Detailed Description and/or Figures.

In some embodiments, a mobile station may include any component or combination of components as described herein in the Detailed Description and/or Figures as included in a mobile station.

In some embodiments, a mobile device may be configured to perform any action or combination of actions as substantially described herein in the Detailed Description and/or Figures.

In some embodiments, a mobile device may include any component or combination of components as described herein in the Detailed Description and/or Figures as included in a mobile device.

In some embodiments, a network node may be configured to perform any action or combination of actions as substantially described herein in the Detailed Description and/or Figures.

In some embodiments, a network node may include any component or combination of components as described herein in the Detailed Description and/or Figures as included in a mobile device.

In some embodiments, a base station may be configured to perform any action or combination of actions as substantially described herein in the Detailed Description and/or Figures.

In some embodiments, a base station may include any component or combination of components as described herein in the Detailed Description and/or Figures as included in a mobile device.

In some embodiments, a 5G NR network node or base station may be configured to perform any action or combination of actions as substantially described herein in the Detailed Description and/or Figures.

In some embodiments, a 5G NR network node or base station may include any component or combination of components as described herein in the Detailed Description and/or Figures as included in a mobile device.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An apparatus, comprising:
   a processor, configured to cause a user equipment device (UE) to:
      connect to a base station (BS);
      establish discontinuous reception (DRX) with the BS, wherein the DRX comprises a DRX cycle having a cycle length;
      transmit a request to the BS, wherein the request indicates timing for reference signal information, the timing comprising m slots prior to a DRX on duration and a duration of n slots;
      receive the reference signal information from the base station in association with the DRX cycle length, wherein the reference signal information is transmitted m slots prior to the DRX on duration for a duration of n slots in response to the request; and
      perform tracking using the reference signal information.

2. The apparatus of claim 1, wherein the DRX comprises connected mode DRX (CDRX).

3. The apparatus of claim 2, wherein the reference signal information is received m slots before the CDRX on duration of each cycle.

4. The apparatus of claim 1, wherein the DRX comprises idle mode DRX.

5. The apparatus of claim 4, wherein the reference signal information is received m slots before a paging occasion of each cycle.

6. The apparatus of claim 1, wherein the UE and BS communicate according to new radio (NR).

7. The apparatus of claim 1, wherein the processor is further configured to cause the UE to receive DRX configuration information from the BS, wherein a location of the reference signal information is specified in the DRX configuration information.

8. The apparatus of claim 1, wherein a location of the reference signal information is not indicated by the BS.

9. The apparatus of claim 4, wherein m and n are specific to CDRX, wherein the request comprises separate timing for idle mode DRX.

10. The apparatus of claim 6, wherein m and n are specific to idle mode DRX, wherein the request comprises separate timing for connected mode DRX (CDRX).

11. A device, comprising:
    wireless communication circuitry; and
    a processor coupled to the wireless communication circuitry, wherein the processor is configured to cause the device to:
       connect to a base station (BS);
       establish discontinuous reception (DRX) with the BS;
       transmit a request to the BS, wherein the request indicates timing for reference signal information, the timing comprising m slots prior to a DRX on duration and a duration of n slots;
       receive the reference signal information from the base station during a plurality of DRX cycles, wherein the reference signal information is received beginning m slots prior to the DRX on duration and continuing for a duration of n slots in response to the request; and
       during each of the plurality of DRX cycles, perform tracking using the reference signal information.

12. The device of claim 11, wherein the reference signal information is received beginning m slots before the DRX on duration of each of the plurality of DRX cycles.

13. The device of claim 11, wherein the reference signal information is received in part during the DRX on duration of each of the plurality of DRX cycles.

14. The device of claim 11, wherein the reference signal information is received at least in part during a paging occasion of each of the plurality of DRX cycles.

15. The device of claim 11, wherein the reference signal information is received beginning m slots before a paging occasion of each of the plurality of DRX cycles.

16. An apparatus, comprising:
    a processor, configured to cause a base station (BS) to:
       connect to a user equipment (UE);
       establish discontinuous reception (DRX) with the UE, wherein the DRX comprises a DRX cycle having a cycle length;
       receive, from the UE a request, wherein the request indicates timing for reference signal information, the timing comprising m slots prior to a DRX on duration and a duration of n slots;
       transmit, to the UE, the reference signal information, wherein the reference signal information is transmitted m slots prior to the DRX on duration for a duration of n slots in response to the request; and
       perform tracking using the reference signal information.

17. The apparatus of claim 16, wherein the DRX comprises connected mode DRX (CDRX).

18. The apparatus of claim 17, wherein the reference signal information is transmitted m slots before the CDRX on duration of each cycle.

19. The apparatus of claim 16, wherein the DRX comprises idle mode DRX.

20. The apparatus of claim 19, wherein the reference signal information is received m slots before a paging occasion of each cycle.

* * * * *